(12) United States Patent
Itay et al.

(10) Patent No.: US 6,483,903 B1
(45) Date of Patent: Nov. 19, 2002

(54) SPLITTERLESS ETHERNET DSL ON SUBSCRIBER LOOPS

(75) Inventors: Jacob Itay, Rishon Lezion (IL); Shaul Ozeri, Tel Aviv (IL)

(73) Assignee: Orckit Communications, LTD, Tel Aviv (IL)

( * ) Notice: Subject to any disclaimer, the term of this patent is extended or adjusted under 35 U.S.C. 154(b) by 0 days.

(21) Appl. No.: 09/346,416

(22) Filed: Jul. 1, 1999

(51) Int. Cl.$^7$ .............................................. H04M 11/00
(52) U.S. Cl. ............................... 379/93.01; 379/93.05; 379/399.01
(58) Field of Search ........................... 379/93.01, 93.05, 379/106.09, 93.09, 394, 398, 399.01, 413.01, 413.02, 413.04, 100.15–100.16, 219; 375/222, 219; 709/311

(56) References Cited

U.S. PATENT DOCUMENTS

| | | | | |
|---|---|---|---|---|
| 6,021,167 A | * | 2/2000 | Wu ............................. | 375/222 |
| 6,269,154 B1 | * | 7/2001 | Chellali et al. ........... | 379/93.09 |
| 6,314,180 B1 | * | 11/2001 | Bingel ....................... | 379/394 |
| 6,324,212 B1 | * | 11/2001 | Jenness ...................... | 370/465 |

FOREIGN PATENT DOCUMENTS

| | | | | |
|---|---|---|---|---|
| WO | WO 9920027 A2 | * | 4/1999 | |
| WO | WO 9929097 A1 | * | 6/1999 | .......... H04M/11/06 |

* cited by examiner

Primary Examiner—Curtis Kuntz
Assistant Examiner—George Eng
(74) Attorney, Agent, or Firm—Roberts, Abokhair & Mardula, LLC

(57) ABSTRACT

A splitterless system provides along a subscriber loop, full Ethernet wire speed data transmission between a date source and an Ethernet standard end device. The system includes a gateway modem device connected to a data source, and arranged in splitterless contact with a subscriber loop extending between a Punch Down Block (PDB), and an Ethernet standard end device; and a user modem device connected between the Ethernet standard end device and the subscriber loop so as to define with the gateway modem device a subscriber loop segment, wherein the gateway modem device and the user modem device are operative to communicate along the loop segment in different predetermined, first and second frequency spectra, for uplinking and downlinking, respectively, thus to facilitate therealong full Ethernet wire speed data transmission therealong.

16 Claims, 8 Drawing Sheets

SPLITTERLESS ETHERNET DSL ON SUBSCRIBER LOOPS

FIELD OF THE INVENTION

The present invention relates to data communications and telecommunications generally, and, in particular, to high speed data transmission over copper telephony wires.

DEFINITION

The term "loop" is used throughout the specification and claims to mean a single twisted pair of copper wires suitable for voice. The term "voice/data device" is intended to mean any telephone, facsimile machine, or other POTs or ISDN device which transmits voice/data along subscriber loops in the frequency band 0–80 kHz.

BACKGROUND OF THE INVENTION

The need to transmit data at high speed over copper wires, by use of various digital subscriber line technologies, is well known. Many businesses and public institutions are well serviced by purpose built local area networks (LANs) for the internal high speed transmission of data.

LANs are often constructed on the basis of twisted pairs of high grade, so-called "category 5" copper wares. Among standard protocols for data transmission along LANs are the well known packet data communications standard IEEE802.3 and Ethernet. By use of this high quality wiring, Ethernet is employed to transmit data signals at a rate of more than 100 MB per second. Accordingly, LANs are commonly used to connect various network devices and personal computers (PCs), referred to herein collectively as "nodes," to a central Ethernet hub or switch, by use of a star topology.

It will thus be appreciated that connection of a high speed direct connection to an Internet or other high speed data provider, referred to herein collectively as "ISPs," inherently provides each node on the network with equally high speed data connectivity to the ISP.

Residential and older office buildings, however, provide a challenge to high quality data transmission, as they normally have relatively low quality copper lines which, apart from being low grade, often category 3 or less, are sought to be used also for traditional voice telephony by means of various active devices such as telephones and fax machines, and will also have many internal connections and splits. Furthermore, while many telephone lines are provided with two or four twisted pairs, so as to enable the use of voice and data connections at the same time, many are provided with single loops, preventing simultaneous use of the line for both voice and data transmission.

Use of existing copper wires in LAN-less environments normally provides a low quality connection due to the presence of multiple connections in the wiring, each connection causing the reflection of electrical signals that create echoes, thereby degrading the quality of reception. The presence of analog voice devices on the lines also occupies a certain amount of the available bandwidth, thereby reducing the bandwidth available far data transmission.

Various solutions for enabling the use of subscriber loops simultaneously for voice and data have been suggested, although they generally involve the use of a splitter, which has the effect of rendering the cost of such systems relatively high. Echo cancellation may also be required, and crosstalk, which occurs in bundled lines extending from the central office of the telephone company to the Punch Down Block (PDB), particularly on high speed DSL services, is also a problem that must be overcome. As known, the (PDB) may be located at any suitable location, such as, in a street cabinet, the basement of an apartment building, or the like.

A splitterless solution that is known in the art, is the so-called "G Lite" standard for Splitterless Asymmetrical Digital Subscriber Line Transceivers. While this clearly does not have the drawbacks of systems requiring the use of splitters it still does not overcome the problem of switching of analog voice devices during use of the line for data communications. In other words, while the use of a copper line for data and voice simultaneously is not a problem, per se, the switching of a telephone, namely, the picking up or replacing of the telephone handset while the line is connected to a data source, such as an ISP, can cause interference to or loss of communication between an end unit such as a PC, and the data source.

Furthermore, many of the high speed solutions to provision of a high data transmission rate related to the provision of data over subscriber loops extending from the central office of the telephone company to the PDB, and thus to the ability to provide data over distances of as much as 20,000 feet or more. Necessarily, these solutions must deal With many problems that arise specifically from the long distance over which the data must be transmitted along telephone lines.

SUMMARY OF THE INVENTION

The present invention seeks to provide a splitterless system for providing 10 MB/sec half/full duplex Ethernet quality data communications via a subscriber loop, wherein the quality of the data transmission is not significantly affected by the simultaneous use of voice/data devices, including POTs. ISDN, telephone and facsimile machines, on the same line. Specifically, the data transmission is not significantly affected either by voice data or by switching of an analog voice device.

A further aim of the present invention is to provide a system which provides Ethernet quality data communications along subscriber loops and is independent of the distance of the subscriber from the telephone company, thereby to overcome problems of known art caused specifically by the necessity of high speed transmission of data over long distances.

Specifically, as will be appreciated from the following description, the system of the present invention is suitable for use with any of the following wiring arrangements:
1. A single loop with a resident voice/data device.
2. A single loop dedicated to data.
3. A pair of loops dedicated to data, providing complete physical separation between uplinking and downlinking.

There is thus provided, an accordance with a preferred embodiment of the present invention, a splitterless system for providing along a subscriber loop, full Ethernet wire speed data transmission between a data source and an Ethernet standard end device. The system includes a gateway modem device connected to a data source, and arranged in splitterless contact with a subscriber loop extending between a Punch Down Block (PDB), and an Ethernet standard end device; and a user modem device connected between the Ethernet standard end device and the subscriber loop so as to define with the gateway modem device a subscriber loop segment wherein the gateway modem device and the user modem device are operative to communicate along the loop segment in different predetermined, first and second frequency spectra, for uplinking and downlinking, respectively, thus to facilitate therealong full Ethernet wire speed data transmission therealong.

Additionally in accordance with a preferred embodiment of the invention, the gateway modem device and the user modem device are operative to communicate in frequency spectra predetermined so as to facilitate full coexistence on the loop with a voice/data device.

Preferably, the gateway modem device and the user modem device are operative to communicate in a frequency spectra having a predetermined minimum value which is greater than that at which the signal to noise ratio (SNR) is greater than or equal to a predetermined minimum value, typically 24 DB, even in the presence of a switching signal caused by a hook on/off action of a voice/data device.

Further in accordance with a preferred embodiment of the invention, the maximum value of the first frequency spectrum for uplinking is no greater than the minimum value of the second frequency spectrum for down linking, wherein, in a case in which no coexistence with voice/data devices is required, the first frequency spectrum is typically in the range 0–4.0 MHz, but more preferably in the range 200 kHz–3.0 MHz, and the second frequency spectrum is in the range 4.0–10.0 MHz, but more preferably in the range 6.0–9.0 MHz.

In a case where coexistence is required, however, the first frequency spectrum is in the range 1.0–4.0 MHz, and the second frequency spectrum is in the range 6.0–9.0 MHz.

Additionally in accordance with a preferred embodiment of the invention, there is also provided apparatus, associated with the gateway modem device, the loop segment, the user modem device and the end unit, for providing along the loop segment a first impedance in response to transmission in the first frequency spectrum, and a second impedance in response to reception In the second frequency spectrum, thereby to provide an unmatched system and thus to reduce a loss in transmission power that occurs in the presence of a change in system impedance caused by a hook on/off action of a voice/data device.

Preferably, the system impedance is less than the matched impedance of the loop segment such that, in a matched system whose impedance is 100 Ω, the impedance provided by the apparatus for providing an impedance is no greater than 93 Ω, and preferably is approximately 80 Ω.

Further in accordance with a preferred embodiment of the invention, the user modem includes apparatus for preventing entry into the modem of ringing voltages of analog/voice devices; and apparatus for preventing entry into the modem of switching voltages, thereby to prevent loss of locking between the user modem and the gateway modem.

Additionally in accordance with a preferred embodiment of the invention, the user modem includes apparatus for transmitting a disconnect signal to the gateway modem upon switching off of the user modem, and wherein, in the presence of user modem initiated a line break of greater than a predetermined time period, in the absence of receipt of the disconnect signal, the gateway modem is operative to provide an alarm signal.

Further in accordance with a preferred embodiment of the invention, the gateway modem device is a multiple modem unit for splitterless connection to a plurality of subscriber loops extending from a common PDB, and wherein the plurality of subscriber loops are connected to a plurality of Ethernet standard end units via a corresponding plurality of the user modems; and the multiple modem unit and the user modems are operative to facilitate communications between the Ethernet standard end units, so as to form an Ethernet standard network thereamong.

BRIEF DESCRIPTION OF THE DRAWINGS

The present invention will be more fully understood and appreciated from the following detailed description, taken in conjunction with the drawings, in which.

DETAILED DESCRIPTION OF THE INVENTION

The present invention seeks to provide a splitterless system for providing 10 MB/sec half/full duplex Ethernet quality data communications via a subscriber loop, wherein the quality of the data transmission is not significantly affected by the simultaneous use of analog voice devices on the same line generally, and in particular, by switching of analog voice devices.

As shown and described below in conjunction with the drawings, the invention further provides a gateway to one or more subscriber loops connected via a common PDB, such as positioned in a street cabinet or basement, thereby facilitating the following:

1. formation of a 10 MS/sec half/full duplex Ethernet virtual network formed of the gateway and one or more nodes on different subscriber loops connected to a common PDB;
2. provision of digital subscriber services via the gateway; and
3. a system characterized by data transmission whose quality is not substantially dependent on range, due to the location of the gateway at the PDB.

As mentioned above, the system can be implemented on a "line" which may consist of a single loop on which both data and voice/data coexist a single loop for data only; or a pair of loops for data only.

An inherent advantage of the system of the present invention, is the capability of forming area networks based on existing loops in residential-type areas, whether the network nodes are individual dwellings, or high density Multi Dwelling Unit (MDU), referred to herein as "MDUs," such as apartment buildings.

From the following description it will be appreciated that, while the examples described and illustrated hereinbelow in detail with regard to the area networks afforded by the splitterless system of the invention are specifically MDUs, a network having a similar topology may also be provided for a single dwelling having multiple telephone lines, as well as for an area containing a plurality of single homes served by a single telephone connection box.

The telephone wiring of an MDU such as described below, is essentially the same for apartment buildings, town houses, hotels, dormitories, and similar structures.

Figure 1A:
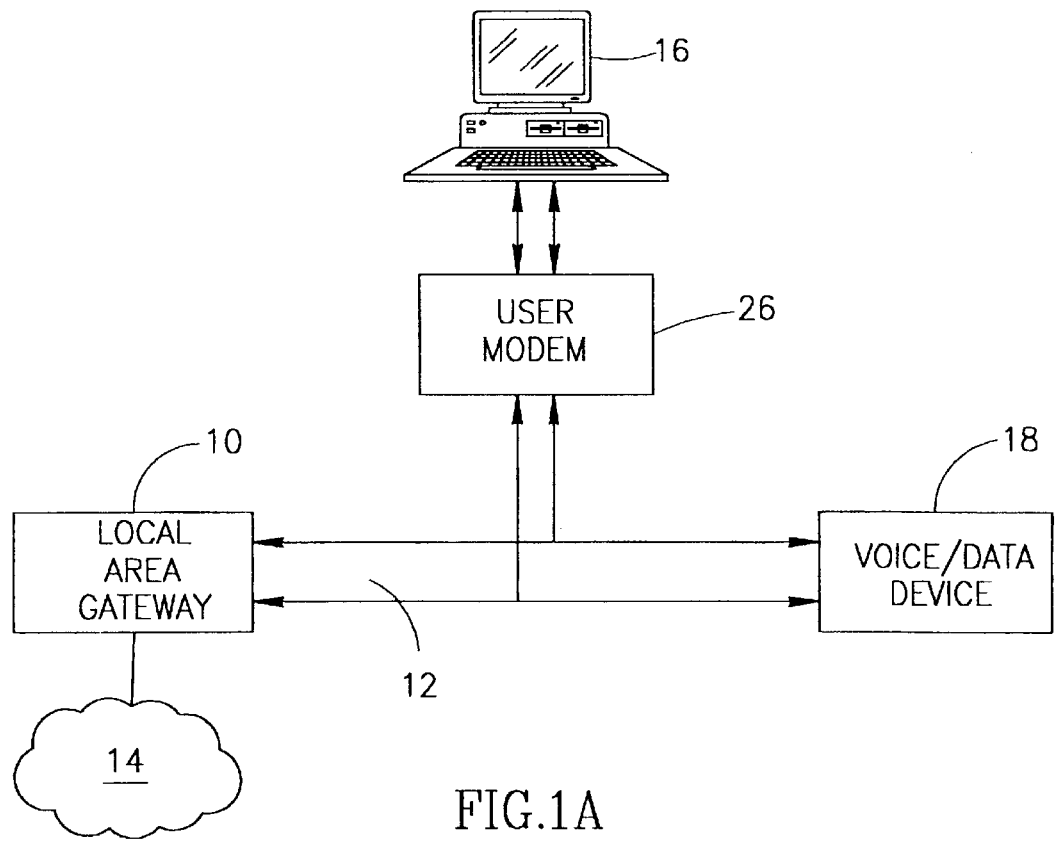
FIG. 1A is a simplified diagrammatic representation of the splitterless Ethernet DSL system, in accordance with a preferred embodiment of the present invention.

Referring now to FIG. 1A, there is seen a basic splitterless system for providing 10 MB/sec half/full duplex Ethernet quality data communications between a user and a service provider, in accordance with the present invention. The system includes a local area gateway, referenced 10, which uses a single or double loop copper telephone line 12 for connecting between a data source 14, typically an Internet service provider, and a computer 16 via user modem referenced 26. The computer 16 is any suitable Ethernet standard device such as a personal computer, via which a user can download and upload data, from and to data source 14. As seen, the line typically also has connected thereto an analog data device 18, such as a telephone or facsimile machine, which, in accordance with the present invention, may be connected in full coexistence with computer 16, and can thus be used simultaneously with use of the line 12 by the computer 16, without causing any significant interference to a connection between the computer modem and data source 14.

Figure 1B:
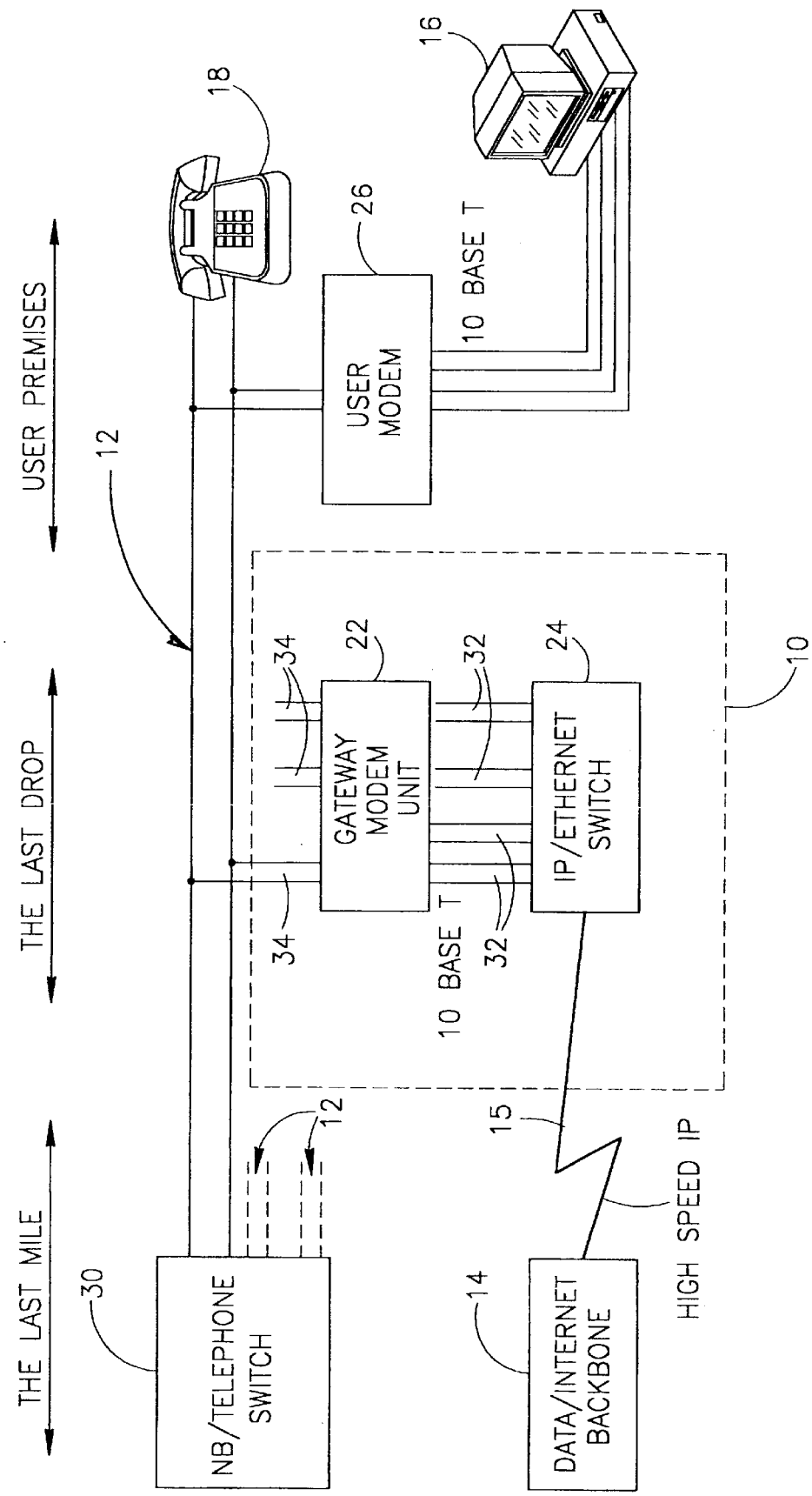
FIG. 1B is a more detailed diagrammatic representation of the system seen in FIG. 1A.

Referring now also to FIG. 1B, the system of the invention is illustrated in greater detail. In particular, local area gateway 10 is seen to include a multiple modem unit 22 which is connected to each subscriber loop 12 adjacent to a PDB, referenced 30, and an Ethernet switch 24 which interfaces directly between the data source 14 and the gateway modem unit 22. Ethernet switch 24 is connected to data source 14 via a suitable high speed link 15, and is further connected gateway modem unit 22 via first connection pairs 32.

Gateway modem unit 22 also has a predetermined number of second connection pairs 34, each connected in splitterless fashion, to a predetermined single or double loop line 12 which extends from the PDB to one or more voice/data devices 18 inside a dwelling. Ethernet switch 24 includes an unlink module which may, for example, be based on—but not limited to—any of the following types of technologies: ADSL or Symmetrical DSL; 10 MB/sec half/full duplex Ethernet, Fast Ethernet, or Giga Ethernet; IP over synchronous optical networks (SONET) or synchronous digital hierarchy (SDH); passive optical networks (PONs); or wireless networks.

The complete coexistence between the analog data devices end the digital data is facilitated by several solutions, each of which may be implemented separately, but which preferably are combined into a single system, as described below. These solutions are detailed hereinbelow, with reference to FIGS. 2–4.

The use of splitterless DSL in the present invention relies on technology embedded in the remote user modem 26 and gateway modem unit 22, as described hereinbelow. Similarly to traditional analog modems, user modem 28 uses existing phone jacks and in house wiring topology. As will be appreciated from the following description, the system of the invention facilitates use of splitterless technology in which, not only is the existing phone service unaffected by adding DSL, but the data communications are themselves totally uninterrupted by normal use of voice/data devices including telephones and facsimile machines simultaneously on the same lines, including switching of telephones (hook ON/OFF).

It will thus be appreciated that, by providing data simultaneous with voice, the herein described "gateway" connection as described herein enables the remote user modem 26 to operate in an "always on" mode, thereby providing "surf on demand."

In order to facilitate the full above described coexistence, the system of the present invention employs Quadrature Amplitude Modulation (QAM) DSL techniques so as to transmit half/full duplex 10 Mbps Ethernet 10 baseT data over a twisted copper pair, with or without voice, as described hereinbelow in greater detail.

Figure 2:
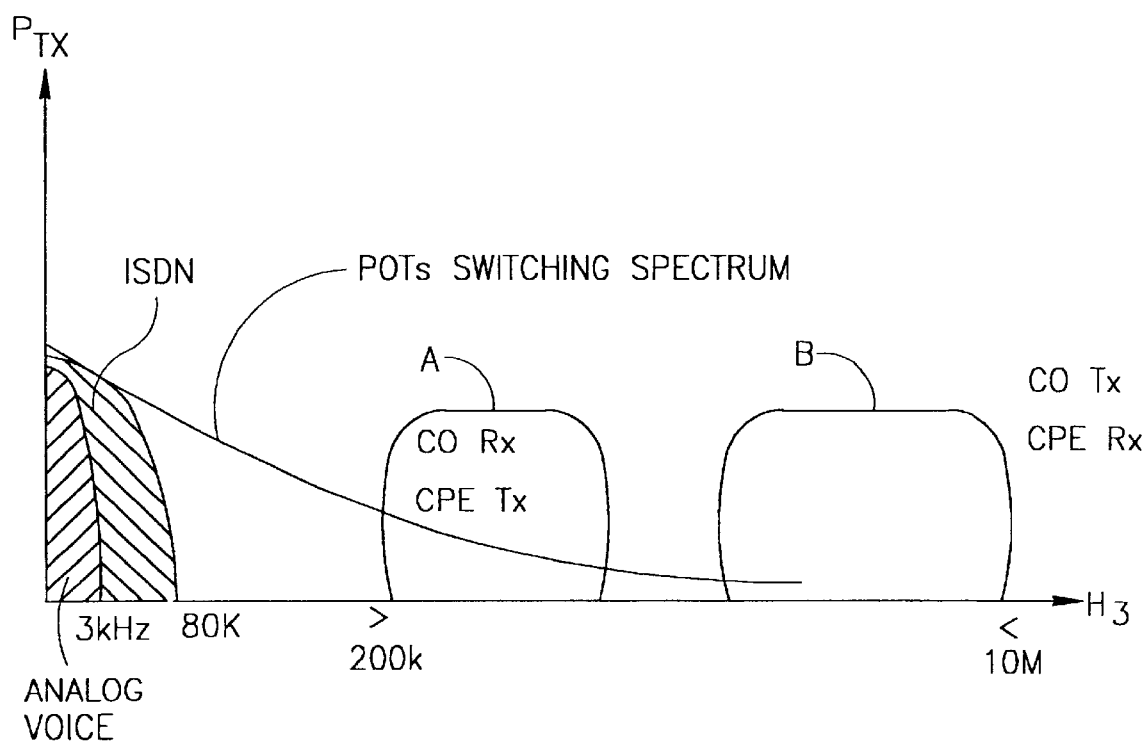
FIG. 2 is a diagram illustrating the respective frequency spectra of telephone devices and the system of the present invention.

The complete coexistence between the telephone device and the computer is facilitated by several solutions, some of which may be implemented separately, but preferably are combined into a single system, as described below. These solutions are as follows:

1. Spectrum separation.
2. Unmatched transmission.
3. Disconnection of data link for short period of time in the presence of interference Spectrum Separation As described above, the present system is splitterless, such that it operates at frequencies which are well above those used by voice/data devices. Referring now to FIG. 2, it is seen that, while voice/data uses frequencies of up to about 3 kHz for POTs, and up to about 80 kHz for ISDN, far more significant is the switching spectrum, namely, the frequency of the signal produced by lifting or replacing the handset on a telephone.

Furthermore, in order to avoid the need to provide echo cancellation, uplinking and downlinking are performed in different frequency spectra. In a case where data and voice/data must coexist on a single loop, the frequency spectra used must be above the ISDN spectrum, and at least above a frequency whereat there is provided an acceptable signal to noise ratio (SNR).

Accordingly, it is thus an aim of the present invention to attenuate the switching power, by using spectra in which the signal to noise ratio (SNR) is at least 24 dB, and thus does not cause significant disturbances to the data connection between the computer 16 and the gateway 10. It is seen that the switching spectrum exists even at frequencies that are much higher than the normal voice frequencies. However, attenuation as described, to an SNR level of at least 24 dB, can be achieved by transmitting data at frequencies above approximately 1 MHz.

In order to further improve the quality of data transmission, the system employs QAM line modulation, substantially as known in the art and which is thus not described herein in detail. Furthermore, and as mentioned above, in order to avoid the necessity of echo cancellation, the "upstream" and "downstream" frequency spectra are separated.

While, in principle, either the uplink (from customer to gateway) or the downlink (from gateway to customer) may operate in a higher frequency band than the other, it is, nonetheless preferred, that the uplink, which requires transmission power from the computer 16, operates in a lower frequency band, namely, 1–4 MHz, referenced A in FIG. 2, while the downlink operates in a higher frequency band, typically 6–9 MHz, referenced B.

The above solution applies specifically to a case in which coexistence on a single loop is required.

For single loops which are dedicated to data transmission, however, while the problem of voice/data switching does not exist, uplink and downlink operate, nonetheless, in different frequency bands, so as to eliminate echo. Accordingly, as no coexistence is required, the uplink may operate in a frequency band of 0–3 MHz, although preferably in the range 200 kHz–3 MHz, while the downlink may operate in a frequency band of 4–7 MHz.

For double loops, i.e. using two twisted pairs, each pair can be dedicated to uplinking or downlinking, so the above-described spectrum separation is optional.

It has been found, further, that the above-described attenuation of the switching power enables the system of the present invention to operate up to a range of approximately 700 m. Bearing in mind that this distance is the distance between the gateway 10, and thus the PDB of the telephone company, and the customer computers 16, this renders the present system suitable for most situations, whether apartment buildings, low density residential areas, campuses, or buildings housing small offices. This advantage, furthermore, enables the provision of area networks in which local area gateway 10 serves both as a server, as well as a piped data interface.

Unmatched Transmission

As known, systems across which electrical energy is transmitted and received should be matched with respect to the impedances of the transmitters and receivers, and with respect to the line, thereby to enable maximum energy to be transferred from the transmitter to the line, and from the line to the receiver.

Figure 3A:
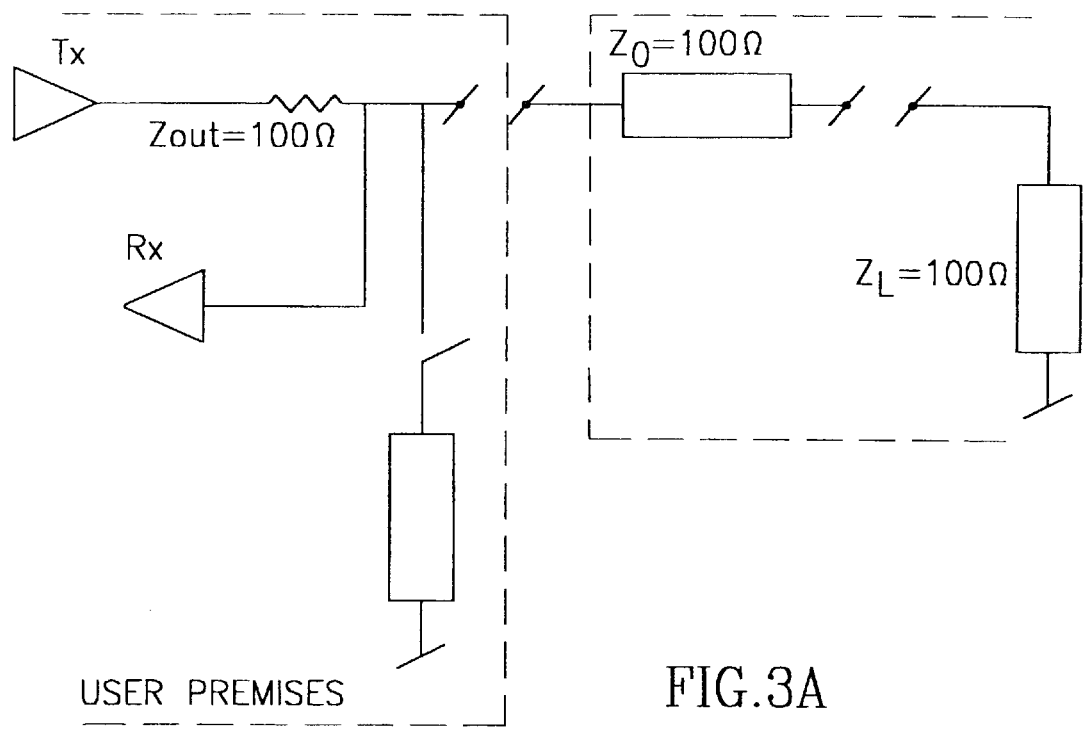
FIG. 3A is an electrical block diagram illustrating the system of the invention as a matched system.

Accordingly and referring briefly to FIG. 3A, it would be desirable for the various impedances, including the characteristic line impedance Zo, the impedance $Z_{out}$ of the transmitter from the user premises, and the load impedance $Z_L$, to be matched. An impedance value of 100 Ω each is common. In fact, this is the situation when the line is dedicated to data transmission only, and no coexistence is required.

Figure 3B:
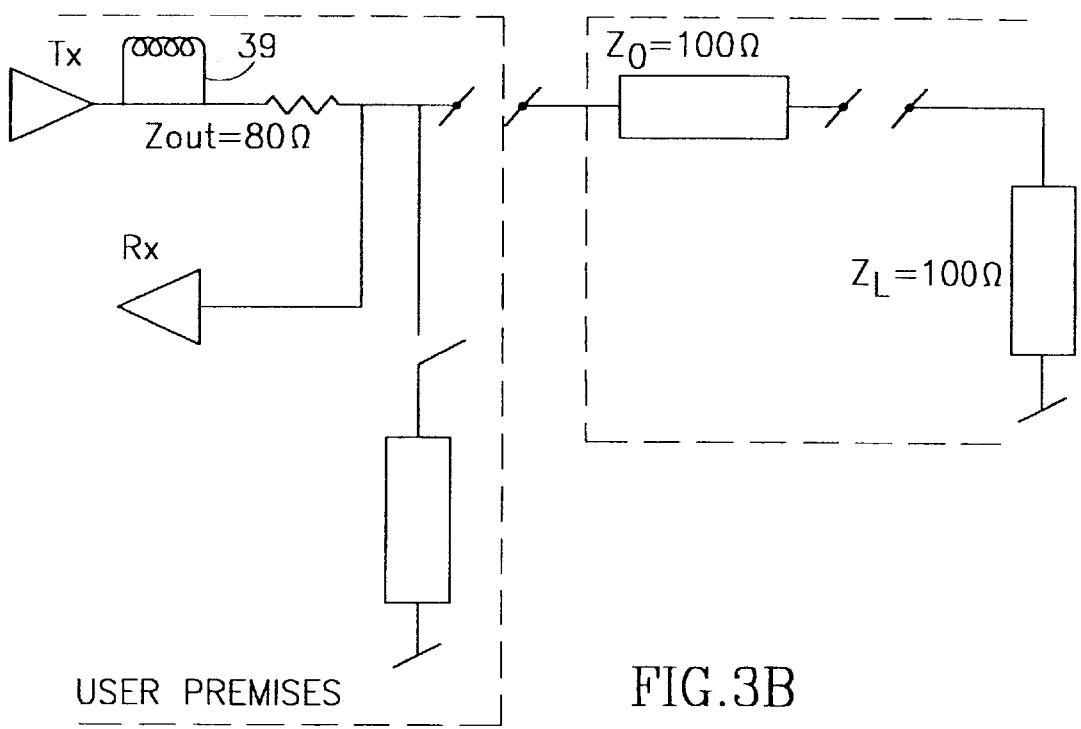
FIG. 3B is an electrical block diagram illustrating the system of the invention as an unmatched system, in accordance with an alternative embodiment of the invention.

Referring now to FIG. 3B, however, when a single loop only is being used, the impedance $Z_{out}$ of the output from the user transmitter Tx is dynamically changed, due to the switching (hook on/oft) of the telephone device. The system is thus inherently unmatched, leading to a loss in transmission power. It has been found that, in view of this change in the load impedance, and in order to maintain transmission power, the output transmission impedance $Z_{out}$ should be as low as possible, ideally equal to zero. Reception, however, requires maximal impedance.

In the present example, therefore, in which both transmission and reception occur over the same two copper wires, the system impedance is fixed at a value which is less than the matched impedance of the line, and which will generally maintain transmission power, but which, at the same time, will not cause substantial deterioration in reception. Preferably, the system impedance is fixed at no more than 93 Ω, and preferably 80 Ω.

Frequency Dependent Impedance

In order to overcome the above problem of unmatched impedance, there may alternatively be provided means for varying the system impedance dynamically in accordance with the transmission and reception frequency spectra employed. In particular, this is facilitated by the provision of a coil, referenced 39 (FIG. 3B), which, provides a low impedance in response to transmission in the low frequency spectrum A, and a relatively higher impedance in response to reception in the higher frequency spectrum B. Preferably, the coil is predetermined to provide an output transmission impedance $Z_{out}$ of no more than 93 Ω, and preferably 80 Ω.

Disconnection of Data Link for Short Period of Time in the Presence of Interference In a splitterless environment, such as exemplified in FIGS. 1A and 1B, the main source of line interference on a single loop is, as discussed hereinabove in conjunction with FIGS. 3A–3B, telephone switching. This can be appreciated by referring particularly to FIG. 2, in which it is seen that switching spectrum is considerably greater than the voice spectrum.

Figure 4:
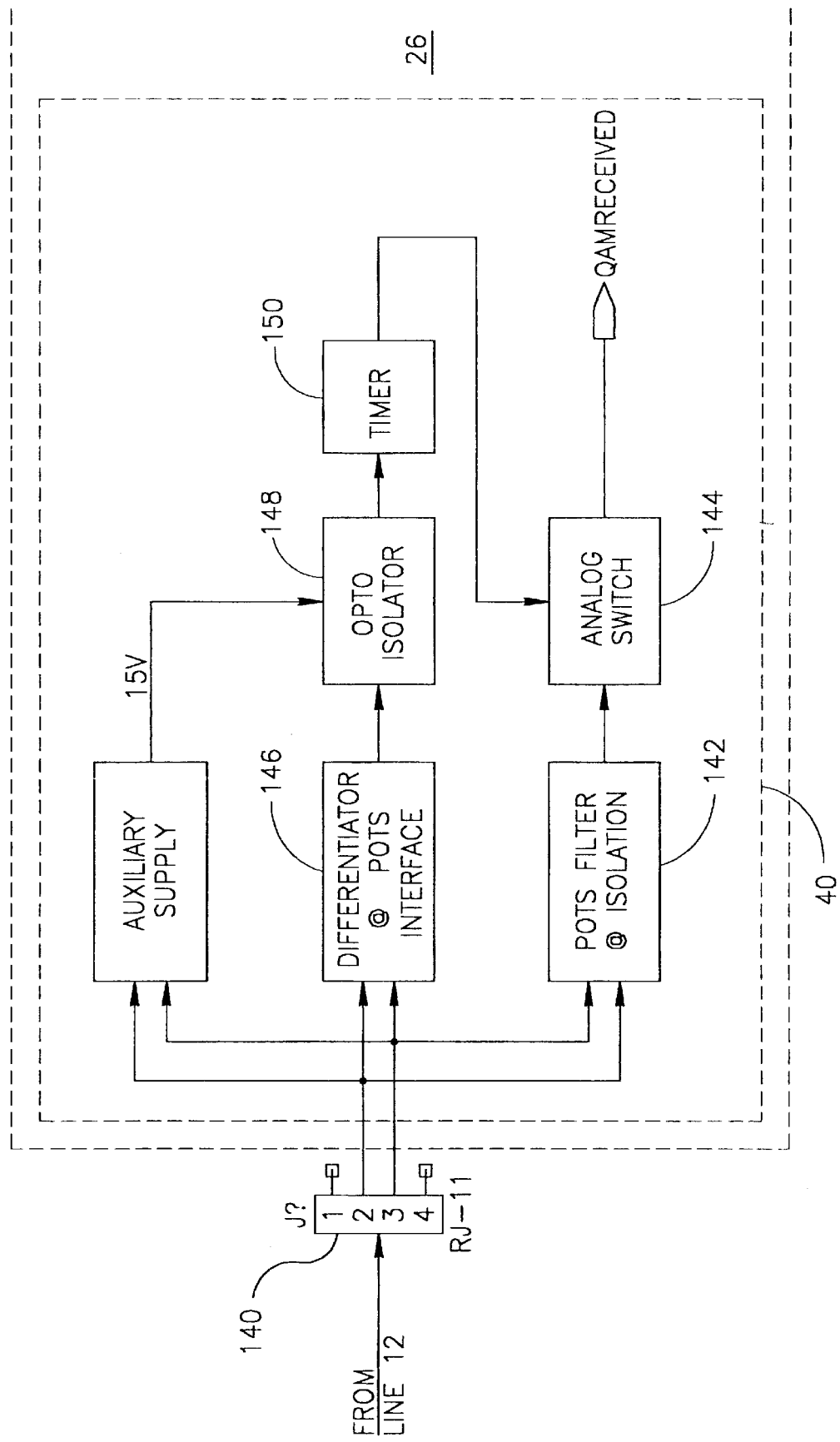
FIG. 4 is a block diagram illustration of a sub-system for initiating a break in data flow in the presence of an interference on the line, in accordance with a further alternative embodiment of the invention.

As a further solution to the above-described problem of coexistence, and referring now to FIG. 4, user modem 26 has provided in conjunction therewith a subsystem 40 which permits normal signal voltage to enter the modem, but which excludes ringing voltage, as well as switching (hook on/oft) voltages. As described below, the ringing voltage is excluded by provision of a high pass filter, while switching voltages are excluded by introduction of a line break for a short time, long enough to prevent saturation of the input amplifier—caused by the presence of rapid DC voltage transients arising from switching—and consequent loss of locking between user modem 28 and gateway 10, but short enough so that the initiated line break does not, itself, cause loss of locking.

As seen in FIG. 4, input voltage from line 12 is provided via connection 140 to a POTs filter and isolator circuit 142, whose task is not only to isolate the modem 26 from the POTS, but also to act as a high pass filter so as to exclude POTs ringing voltages. Incoming filtered signals are provided from filter and isolator circuit 142 via a normally closed analog switch 144, which passes the filtered signal to the modem 26. The incoming line signal is also passed to a differentiation and POTs interface circuit (DPI) 146, which is operative to sense the presence of fast DC transients on the line.

In the presence of a fast DC transient, DPI 146 is operative to provide a signal to an optoisolator 148, which activates preferably a one shot timer circuit 150, for switching analog switch 144 into an open circuit position, thereby to prevent modem 26 from seeing the incoming signals.

The duration of the signal caused by switching is typically in the range 1.0 μsec–0.3 msec, depending on the type of device. Timer 150 is operative to disconnect user modem 26 and gateway 10 for a period greater than 0.3 msec, but typically no more than 50 msec, so as not to lose communication between user modem 26 and gateway 10, and after which data flow is resumed.

As will be appreciated by persons skilled in the art, the present solution may be employed either in place of the above-described solutions to the problem of coexistence, but is preferably used in addition thereto, thereby to further increase the range over which the system can be employed, as measured from the gateway 10 and the PDB, and a user.

User Initiated Line Breaks

As a further feature of the system of the present invention, user modem 26 is operative, in response to a "disconnect" command, such as when a user has finished operations on his computer 16 and switched off his modem or computer, as appropriate, to transmit a "disconnect" code to the gateway 10. Upon receiving this signal, gateway 10 knows to expect a line break.

In the event that the communications between gateway 10 and modem 26 lose synchronization, however, without gateway 10 first having received the disconnect code, an alarm signal will be emitted by gateway 10. Generally, this situation will arise in the event of a physical break in the telephone line, in which case the alarm signal may be sent to the telephone company.

In-Residence Topologies

Figure 5:
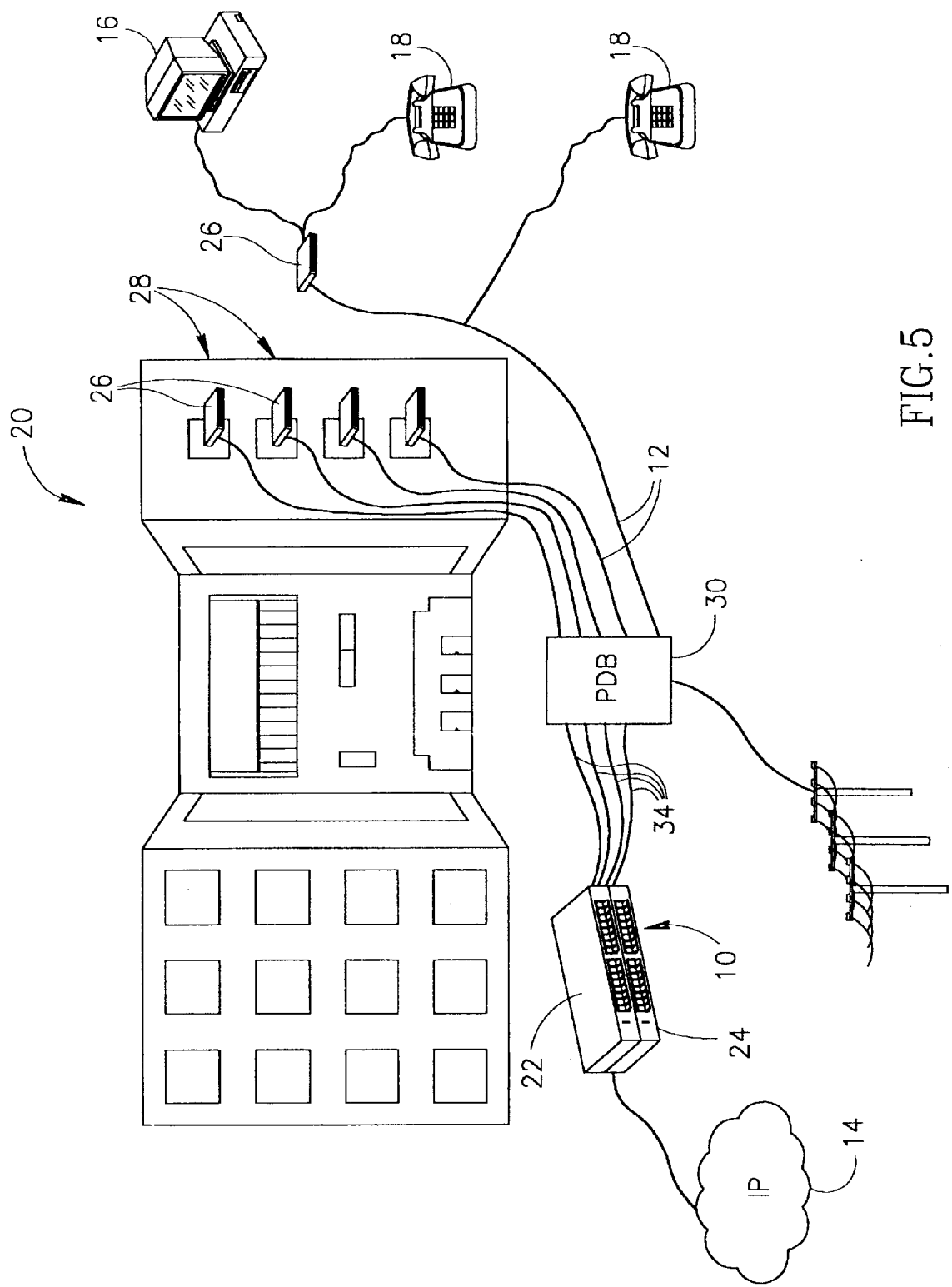
FIG. 5 is a schematic illustration of a Multi Dwelling Unit (MDU) having therein a data network arrangement in accordance with a preferred embodiment of the present invention.

Referring now specifically FIG. 5, there is seen an MDU 20 in which each residence, referenced 28, has wiring 12 which may be one or more subscriber loops, employing any of the above described solutions, i.e. single loop with or without coexistence, or double loop. Normally, the number of loops depends on the age and the location of the building.

The system of the invention relies on the existence of a high speed data pipe, such as any suitable high speed link, for example, copper lines, coax cable, fiber optic, and satellite communications, to an Internet Provider, for example, at the "last mile," as seen in FIG. 2. Topologically, the "last mile" is the last segment or edge of a network. At the end of the last mile is the last drop," namely, entry into "user premises." The area network of the present invention is employed across the last drop and in the user premises, as indicated in FIG. 5, and, functionally, provides an extension of the high speed network using traditional telephone copper wire for 10 MB/sec half/full duplex Ethernet communications, while utilizing digital subscriber line technologies.

As seen in FIG. 5, in practice, loops 12 extends from a PDB 30, which in the illustrated example might be located in the basement of the MDU 20, to each of a plurality of residences 28. PDB 30 is connected to a telephone company as illustrated schematically.

Figure 6:
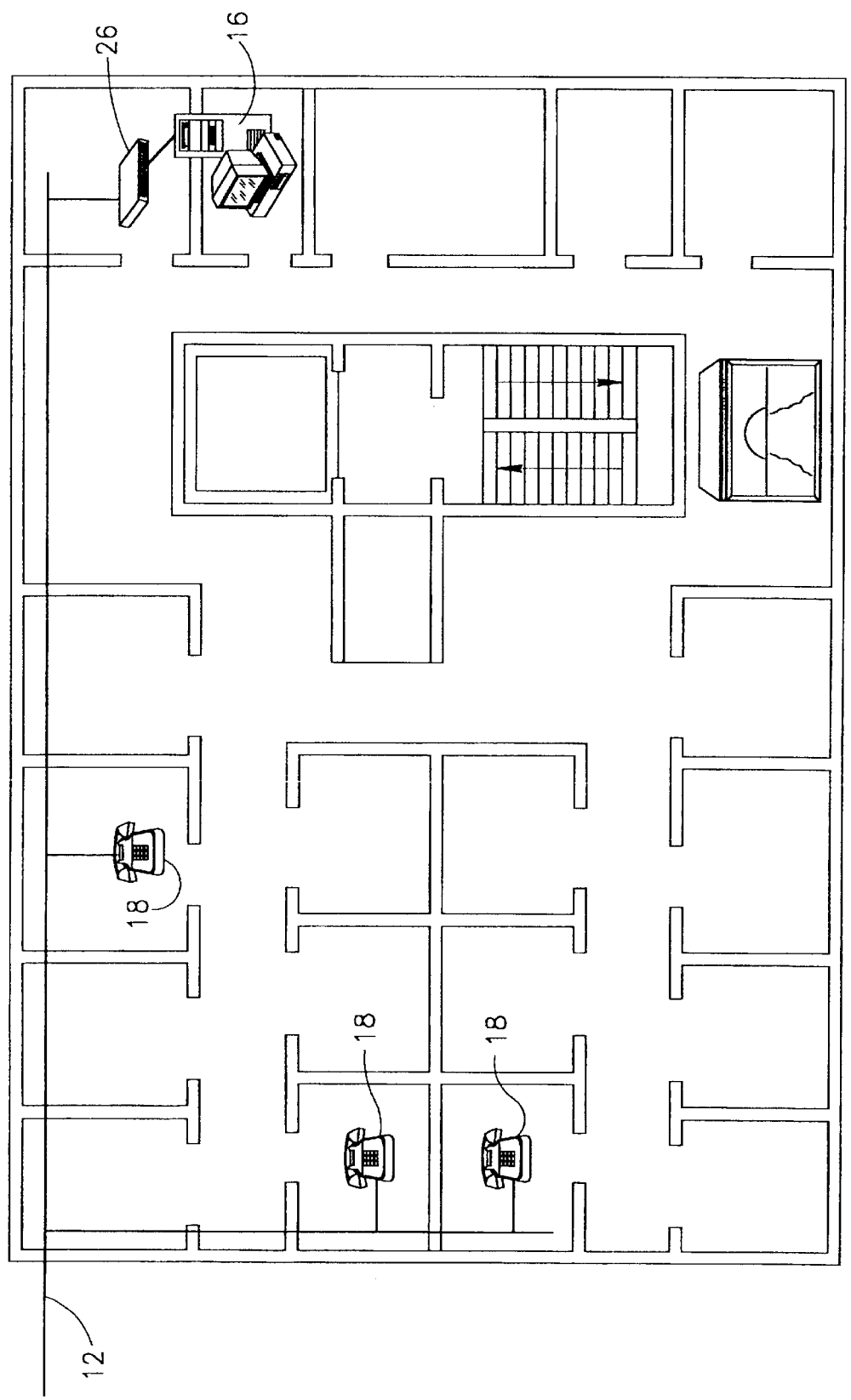
FIG. 6 is a diagrammatic illustration of a typical house plan, showing an in-dwelling single loop wiring arrangement on which are resident a plurality of telephone devices and a 10 BaseT communications protocol end unit, in accordance with the present invention.

Referring now also to FIG. 6, the wiring 12, once inside the dwellings 28 (FIG. 5), extends in a star topology, connecting to various voice/data devices, such as telephones 18 and facsimile machines (not shown).

Figure 7:
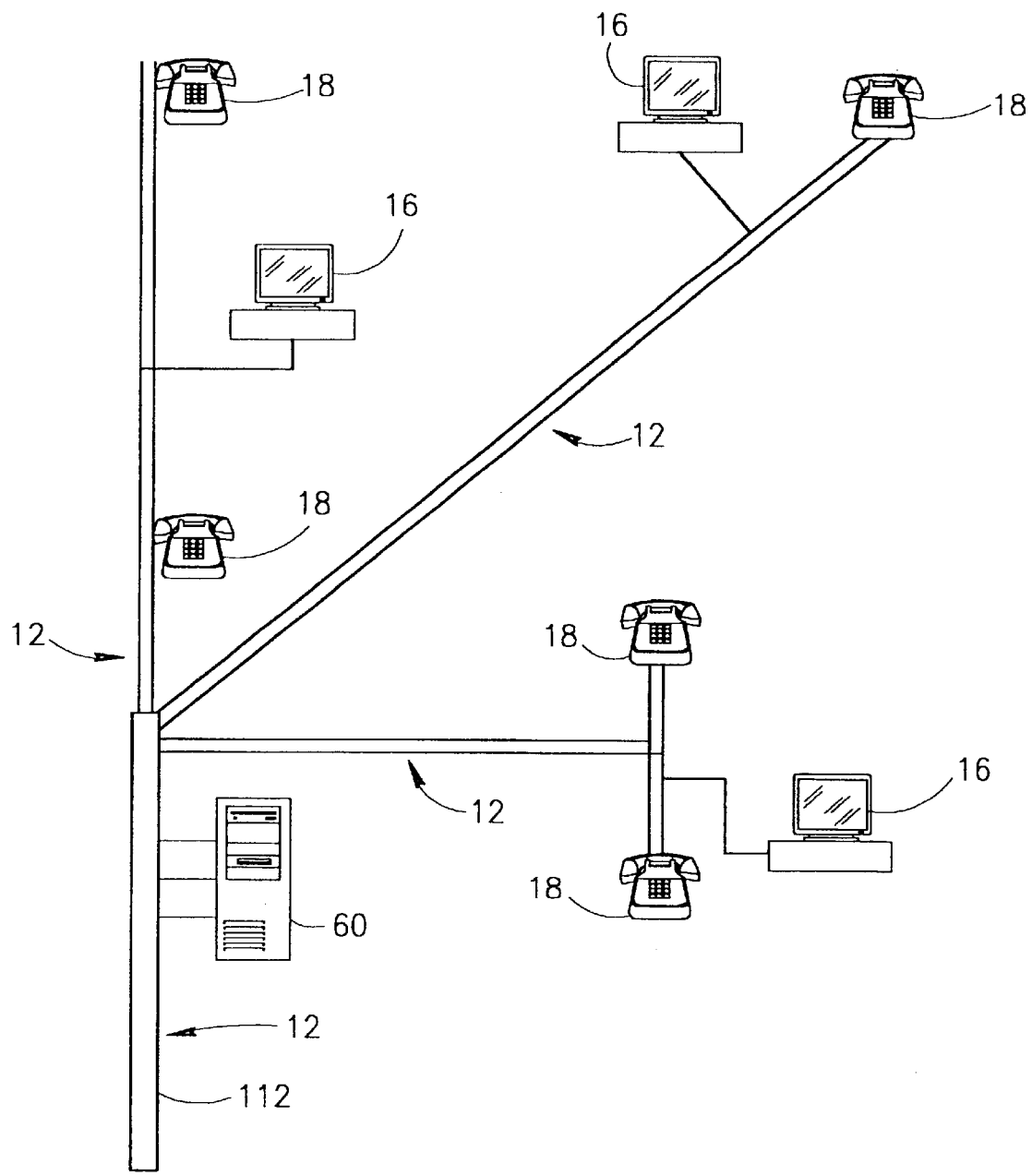
FIG. 7 is a diagrammatic illustration of a Home Area Network (HAN) having a star topology, using multiple telephone copper lines—typically also single loop—to provide an Ethernet 10 BaseT local area network, in accordance with an additional embodiment of the invention.
Figure 8:
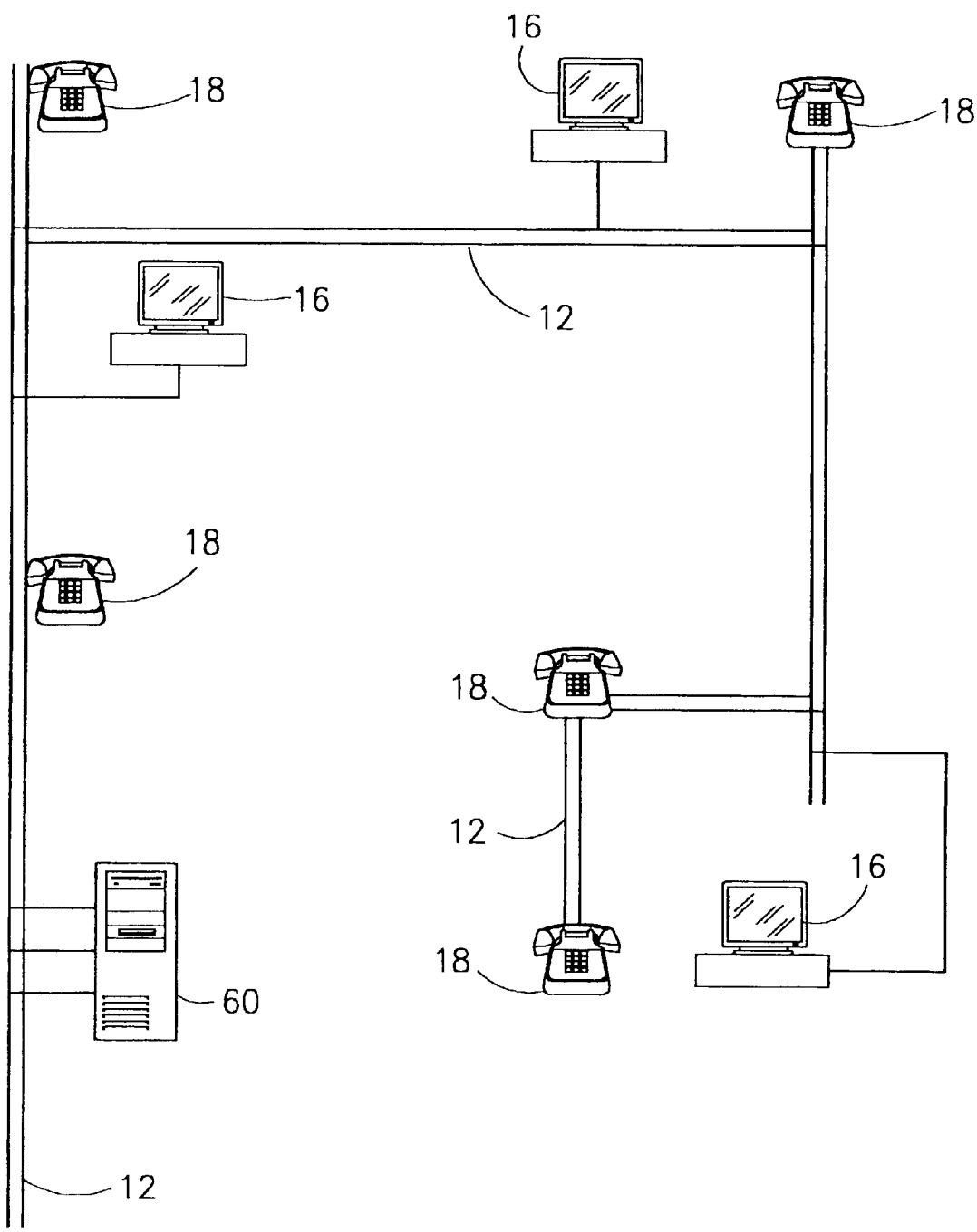
FIG. 8 is a diagrammatic illustration of a HAN, generally similar to that of FIG. 7, but employing a single line only so as to have a bus topology.

Referring now to FIGS. 7 and 8, the system of the present invention further facilitates provision of a "Home Area Network" (HAN), in a single dwelling having either a plurality of separate telephone lines so as to have a star topology, as seen in FIG. 7; or having a single telephone line having a plurality of extensions so as to have a bus topology, as seen in FIG. 8.

Referring now to FIG. 7, the HAN essentially mimics a fully switched Ethernet LAN, but by using the existing copper telephony wiring. As in the hereinbefore described embodiment of the invention, while the system uses the wiring provided for an existing telephone service, the telephone and network services operate simultaneously and without mutual interference.

The HAN implements a 10 MB/sec half/full duplex Ethernet Digital Subscriber Line system over the telephone copper wires. In this arrangement, each end unit 16, such as a PC, has it's own dedicated Ethernet interface or equivalent, and the switching is performed at a central location, which is usually located near the user's peripherals. The HAN employs a connector unit 60 for switching the peripherals and the remote devices 16, within the dwelling.

Connector unit 60 is a multiple modem unit, having a plurality of network modems (not shown separately) and connects in splitterless fashion, to two or more loops 12 inside the dwelling. Each line further has splitterlessly connected thereto a remote user modem (FIG. 1B), shown and described above in conjunction with FIGS. 1B–4, to which an end device 16 is connected, and via which each end device 16 communicates with the remainder of the home area network. More specifically, connector unit 60 operates as described below in conjunction with FIG. 8.

Referring now to FIG. 8, the illustrated HAN is different from that of FIG. 7, in as far as it provides a multiple user network, but using a single line only, so as to have a bus topology. In order to provide the necessary sharing of a single line, connector unit 60 is operated using a frequency division multiplex (FDM) arrangement. In this type of arrangement, each end device 16 has a preselected address, and communications along a predetermined segment existing between each end device 16 and connector unit 60 are provided in a preselected spectrum portion only, such that multi-channel communications can occur along the same line simultaneously, all of which is transparent to voice communications therealong, which remain substantially unhindered thereby.

In accordance with an alternative embodiment of the invention, the HAN may operate in accordance with the well known RS-485 standard, which, when used with suitable management protocol, provides for a full duplex interface over a two wire line, of multiple end devices 16.

It will be appreciated by persons skilled in the art, that any of the above-described HANs may be implemented regardless of the precise number of loops, and whether or not, in the case of a single loop, coexistence is required, in which case any of the solutions shown and described above in conjunction with any of FIGS. 1–4, permitting surf on demand, may be implemented, as required.

It will be appreciated by persons skilled in the art that the scope of the present invention is not limited by what has been shown and described hereinabove. Rather the scope of the present invention is limited solely by the claims, which follow.

What is claimed is:

1. A splitterless system for providing along a subscriber loop, full Ethernet wire speed data transmission between a data source and an Ethernet standard end device, wherein said system includes:

a gateway modem device connected to the data source, and arranged in splitterless contact with a subscriber loop extending between a Punch Down Block (PDB), and the Ethernet standard end device; and a user modem device connected between the Ethernet standard end device and the subscriber loop so as to define with said gateway modem device a subscriber loop segment, wherein said gateway modem device and said user modem device are operative to communicate along the loop segment in different predetermined, first and second frequency spectra, for uplinking and downlinking, respectively, thus to facilitate therealong full Ethernet wire speed data transmission therealong, and wherein said user modem includes:

apparatus for preventing entry into said user modem of ringing voltages of analog/voice devices, and apparatus for preventing entry into said user modem of switching voltages, thereby to prevent loss of locking between said user modem and said gateway modem, which includes:

apparatus for detecting the presence of switching voltages on the loop segment, and for providing an output signal indicative of the presence thereof;

a normally closed switch circuit for selectably isolating said user modem from the loop segment; and a timer associated with said apparatus for detecting the presence of switching voltages and with said switch circuit, operative, upon receiving said output signal, to move said switch circuit into an open circuit position for a period of time predetermined to be greater than the time period during which the switching voltages exist on the loop segment, but less than that which would cause a loss of locking between said user modem and said gateway modem.

2. A system according to claim 1, wherein said gateway modem device and said user modem device are operative to communicate in frequency spectra predetermined so as to facilitate full coexistence on the loop with a voice/data device.

3. A system according to claim 2, wherein said gateway modem device and said user modem device are operative to communicate in a frequency spectra having a predetermined minimum frequency value, such that said predetermined minimum frequency value is greater than a frequency spectra value at which the signal to noise ratio (SNR) is greater than or equal to a predetermined minimum signal to noise ratio value, even in the presence of a switching signal caused by a hook on/off action of a voice/data device.

4. A system according to claim 3, wherein said predetermined minimum SNR is 24 dB.

5. A system according to claim 1, wherein the maximum value of said first frequency spectrum for uplinking is no greater than the minimum value of said second frequency spectrum for downlinking.

6. A system according to claim 5, wherein said first frequency spectrum is in the range 0–4.0 MHz, and said second frequency spectrum is in the range 4.0–9.0 MHz.

7. A system according to claim 5, wherein said first frequency spectrum is in the range 1.0–4.0 MHz, and said second frequency spectrum is in the range 6.0–9.0 MHz.

8. A system according to claim 5, wherein said first frequency spectrum is in the range 200 kHz–3.0 MHz, and said second frequency spectrum is in the range 4.0 7.0 MHz.

9. A system according to claim 1, also including apparatus, associated with said gateway modem device, the loop segment, said user modem device and the end unit, for providing along the loop segment a first impedance in response to transmission in said first frequency spectrum, and a second impedance in response to reception in said second frequency spectrum, thereby to provide an unmatched system and thus to reduce a loss in transmission power that occurs in the presence of a change in system impedance caused by a hook on/off action of a voice/data device.

10. A system according to claim 9, wherein the system impedance is less than the matched impedance of the loop segment.

11. A system according to claim 9, and wherein, when the matched system impedance is 100 Ω, the impedance provided by said apparatus for providing an impedance is no greater than 93 Ω.

12. A system according to claim 11, and wherein the impedance provided by said apparatus for providing an impedance equals approximately 80 Ω.

13. A system according to claim 1, wherein said predetermined time period during which said user modem is isolated is in the range 0.3–50 msec.

14. A system according to claim 1, wherein said user modem includes apparatus for transmitting a disconnect signal to said gateway modem upon switching off of said user modem and wherein, in the presence of user modem initiated a line break of greater than a predetermined time period, in the absence of receipt of said disconnect signal, said gateway modem is operative to provide an alarm signal.

15. A system according to claim 1, wherein said gateway modem device is a multiple modem unit for splitterless connection to a plurality of subscriber loops extending from a common PDB, and wherein the plurality of subscriber loops are connected to a plurality of Ethernet standard end units via a corresponding plurality of said user modems.

16. A system according to claim 15, wherein said multiple modem unit and said user modems are operative to facilitate communications between the Ethernet standard end units, so as to form an Ethernet standard network thereamong.

\* \* \* \* \*